United States Patent [19]

Vercellone et al.

[11] 4,064,646
[45] Dec. 27, 1977

[54] FISHING LURE

[76] Inventors: Mario J. Vercellone; William S. Travers, both of 87 Wilbur Ave., North Dartmouth, Mass. 02747

[21] Appl. No.: 698,892

[22] Filed: June 23, 1976

[51] Int. Cl.² .............................................. A01K 85/00
[52] U.S. Cl. ................................................... 43/42.41
[58] Field of Search ............................. 43/42.41, 42.36

[56] References Cited

U.S. PATENT DOCUMENTS

| 2,470,861 | 5/1949 | Prentice | 43/42.36 X |
| 2,581,485 | 1/1952 | Herkenham | 43/42.36 |

Primary Examiner—Jay N. Eskovitz
Assistant Examiner—Daniel J. Leach

[57] ABSTRACT

A fish lure is disclosed comprising a body or plug used to simulate fish bait in which a retractable hook or plurality of retractable hooks are mounted. The hooks are released from a retracted position to an extended position when the lure is drawn through water. This is achieved by mounting a shaft slideably within the body of the lure and securing the hooks to the shaft. A trigger is provided on the lure which engages the shaft to hold it in a position such that the hooks are pulled in towards the body of the lure. When the trigger is released by pulling the lure through the water, a resilient member biases the shaft in a direction to allow the hooks to swing freely from the body of the lure. The trigger comprises a sear having a diving plane on one end thereof, the sear being pivotally secured to the body of the fish lure and which releasably engages a stop on the shaft.

2 Claims, 3 Drawing Figures

FISHING LURE

SUMMARY OF THE INVENTION

The present invention relates to a fishing lure comprising a body for drawing through water to simulate fish bait, hooks retractably extending from the body for hooking fish, the hooks being mounted on a retractor secured to the body and for holding the hooks proximate to the body. The retractor allows the hooks to be released to hang free from the body when the lure is drawn through water.

In another embodiment, the retractor comprises a shaft for pivotally securing the hooks thereto, the shaft being slideably mounted in the body. Hook protection members extend from the body for shielding the points on the hooks. The shaft is slidably positionable to hold the hooks proximate to the hook protection members and to move the hooks away from the hook protection members to hang freely from the body when the fishing lure is drawn through water.

In another embodiment, the shaft is resiliently biased in the body by a resilient member connected to the shaft and the body, the shaft being releasably secured to a trigger for holding the shaft in a first position. The trigger is mounted on the body of the lure. The resilient member resiliently biases the shaft slideably from a first position to a second position when the trigger is released, the shaft holding the hook member proximate to the hook protecting means when the shaft is in the first position and the shaft holding the hook members away from the hook protection members to hang freely from the body when the shaft is in the second position. When the lure is moved through the water the trigger is released and the shaft is resiliently biased into the second position.

The trigger comprises a sear member pivotally secured to the fishing lure through a pivot, the sear engaging a stop mechanism in the shaft. The trigger may further comprise a pivotal diving plane extending from the sear for forcing the sear to disengage the stop when the lure is drawn through water. In yet another embodiment, the sear is pivotally secured to the fishing lure through a pivot mounted on a stationary diving plane, the stationary diving plane in turn being secured to the body of the fish lure.

DETAILED DESCRIPTION

Figure 2:
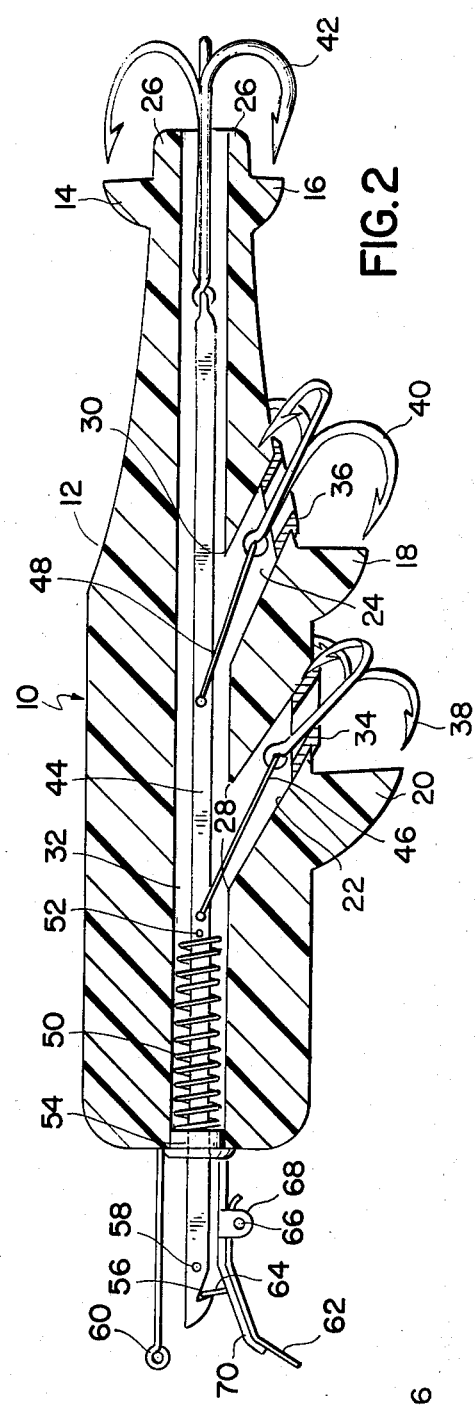
FIG. 2 comprises a side elevation in section illustrating a fishing lure having hooks which are retractable into hook protection members, the hooks being releasable to dangle freely from the fishing lure by means of a trigger which is tripped when the lure is drawn through the water according to one embodiment of the present invention.

The prior art discloses a variety of fishing lures in which the hook of the lure is protected to avoid snagging and in some instances, the hook is releasable from the body of the lure after a fish has struck the lure. Some of these references comprise U.S. Pat. Nos. 3,755,952 Oliphant; 3,665,634 Baud; 3,657,836 Harris; 3,631,624 Edde; 3,410,019 Landi; 3,086,313 Dinehart; 2,991,580 Shutrits; 2,884,731 Hodgson, et al.; 2,729,013 Chandler and 2,518,238 Keeler.

None of the foregoing references disclose a fishing lure having retractable hooks which may be released through a mechanism which is in control of the fisherman. All of the prior art references noted above in which retractable hooks are employed are released only through a fish striking the lure and tripping a mechanism which causes the hooks to extend beyond the body of the lure. It would be a great advantage to provide a fishing lure in which the hooks are retractable as a safety device and which would allow a longer cast of the lure if the hooks are in a non-extended position to eliminate or minimize wind resistance of the hooks as the lure is being cast. It would also be an advantage to provide a lure having a plurality of hooks thereon which may be retracted to avoid the hooks from tangling with one another during casting and release of the hooks would be in control of the person casting the lure. It would also be desirable to have a fishing lure in which the release of the hooks would be in the control of the person casting the lure.

It is therefore an object of the present invention to overcome these and other difficulties of the prior art and to provide means to attain the objectives set forth above.

These and other difficulties have been overcome and the foregoing objectives achieved by the present invention which will become apparent by reference to the disclosure and claims that follow as well as the appended drawing.

Referring to the drawing, a fishing lure 10 is illustrated comprising a body member 12 having an opening therein for receiving a tube 32 such as an aluminum tube 32 having openings 28 and 30 therein which are registrable with the openings 22 and 24 in body 12. Hook protecting members 14 and 16 and 18 and 20 are positioned next to the openings 26, 24 and 22, respectively, in body 12 for protecting the points and barbs of hooks 42, 40 and 38, these hooks being secured to a slideable shaft 44 mounted within the tube 32 in body 12. Hook 42 is directly secured to shaft 44 by means of an eyelet opening at the end of shaft 44 whereas hooks 38 and 40 are secured to shaft 44 by means of extensions 46 and 48. A grommet 54 seals one opening in the body 12 and through which shaft 44 is slideably mounted and against which a resilient member such as coil spring 50 is braced, the other end of coil spring 50 being held in position by means of a pin 52 extending through a shaft 44. A second pin 58 is also provided to restrict the sliding movement of shaft 44 relative to plug 54 to the distance between pins 52 and 58. Grommets 34 and 36 are also provided in the openings 22 and 24 and are made of a material such as nylon or its equivalent to facilitate the smooth and even movement of the shanks of the hooks 38 and 40 in and out of openings 24 and 22. A grommet similar to grommets 34 or 36 may also be inserted in the opening 26 (not illustrated) if desired.

One end of shaft 44 terminates in a stop 56 which engages a trigger sear 64, sear 64 being mounted on a diving plane 62 pivotally secured to a fixed plane 70 by means of pivots 66 extending from flange 68 secured to plane 70. Sear 64 extends upwardly through an opening 65 in plane 70. A wire lead 60 having an eyelet on the end thereof is secured to the body 12 of fishing lure 10, a fishing line being connectable to the wire lead 60 and especially through the eyelet opening therein.

Figure 3:
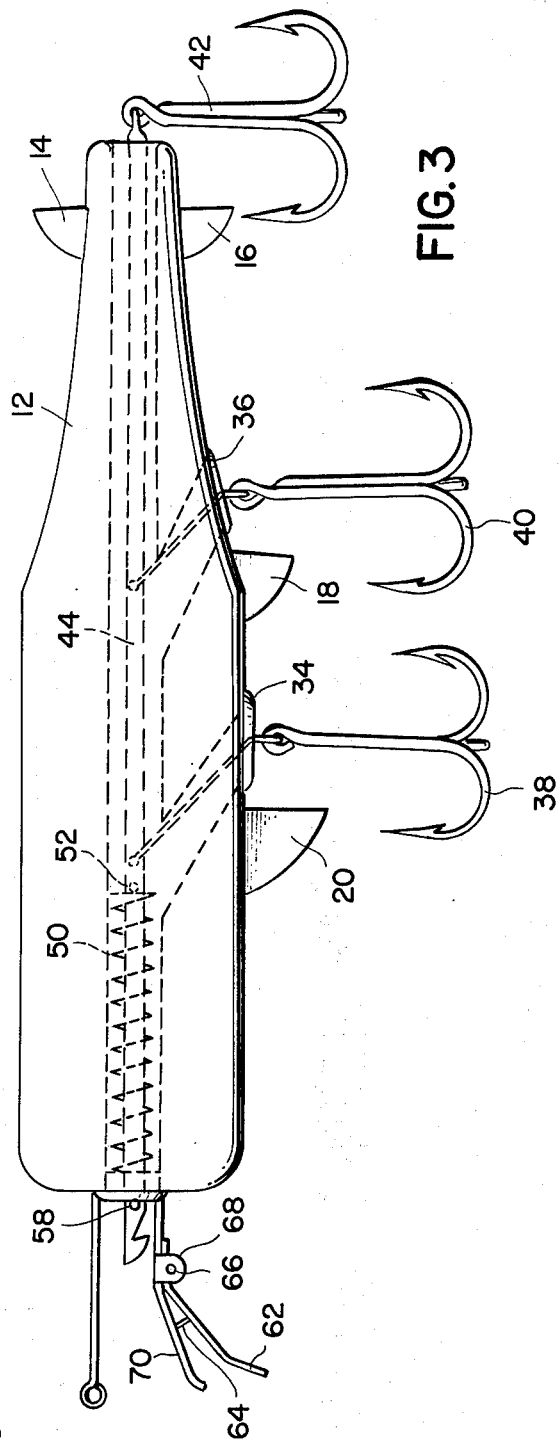
FIG. 3 comprises a side elevation in section of a fishing lure which has hooks released from the body thereof by means of a trigger device that is tripped when the fishing lure is drawn through water according to another embodiment of the present invention and corresponds to the position of the fishing hooks of the lure of FIG. 2 when these fishing hooks are positioned to dangle freely from the body of the lure.
Figure 1:
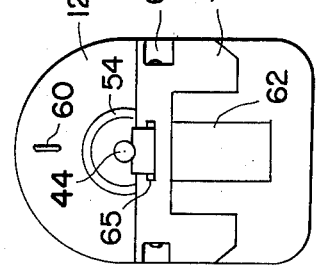
FIG. 1 comprises a front end view of a fishing lure having a trigger thereon for releasing hooks from the body of the lure when the lure is drawn through water according to one embodiment of the present invention.

In use, the resilient member or coil spring 50 is compressed by sliding the shaft 44 in a direction to bring the hooks 38, 40 and 42 into a position proximate to the hook protection members 14, 16, 18 and 20 as illustrated in FIG. 2. The hooks thus resiliently biased in this position are held in place by pivoting the diving plane 62 upwardly so that the sear 64 passes through the opening 65 and engages the catch 56 on shaft 44. A fishing line is then connected to wire lead 60 and the lure 10 is cast into water. The sear 64 may be released from catch 56 once the lure 10 is in water by retrieving the lure quickly or with a sudden forward motion in which the diving plane 62 would be pressed downwardly by the resistance of the diving plane 62 to the water through which it is suddenly drawn. Plane 62 moves downwardly on pivots 66 and sear 64 is released from stop 56. The resilient member or spring 50 then returns the shaft 44 to an extended position to position hooks 38, 40 and 42 to dangle freely from the body 12 of lure 10 as illustrated in FIG. 3. The releasing force of the sear 64 is determined by the amount of compression force resiliently applied to the shaft 44 through the resilient member or coil spring 50. By employing a spring 50 which can develop a relatively large compressive force, the release force required to disengage sear 64 from catch 56 may be increased and vice-versa. Thus, a slow retrieve of the lure through grassy or marshy areas in which aquatic plants abound, will assure that the hooks 38, 40 and 42 will not be released and thereby cause the lure 10 to become hung up. A faster retrieve once the lure is in open water will cause the diving plane 62 to move downwards to release sear 64 from stop 56 and thereby permit spring 50 to expand and position the hooks 38, 40 and 42 in a ready position for hooking a fish.

By employing the present invention, a fishing lure or plug is provided which has a safety feature of keeping the hooks retracted before and during the casting of the lure. The hooks do not snarl or tangle during the cast which is an advantage since the lure will enter the water and can be retrieved as designed to simulate the movement of a bait fish without having this movement interrupted or interfered with by tangled hooks on the lure. Longer casts are possible since the hooks are drawn into the body of the plug to provide a more streamlined configuration and reduce wind resistance of the lure as it is being cast.

Additionally, all of the mechanical parts of the lure may be constructed of rust-proof or rust resistant material such as aluminum, brass, bronze and the like. The lure may be fabricated in different sizes, i.e., different lengths and weights for use with big or smaller fish whether in fresh water or salt water. Also, any number of hooks can be employed, although with the present lure, it is easier to use a plurality of hooks since the likelihood of their being tangled is minimized or eliminated by the present invention.

Although the invention has been described by reference to some embodiments, it is not intended that the novel fish lure be limited thereby, but that modifications thereof are intended to be included as falling within the broad scope and spirit of the foregoing disclosure, the following claims and the appended drawing.

What is claimed is:

1. A fishing lure comprising body means for drawing through the water to simulate fish bait, said body means having hook means retractably extending therefrom for hooking fish, said hook means mounted on retractor means secured to said body means for holding said hook means proximate to said body means, said retractor means releasing said hook means to hang free from said body means when said fishing lure is drawn through water, said retractor means comprising shaft means for securing said hook means thereto, said shaft means being slidably mounted in said body means, hook protection means on said body means for shielding the points on said hook means, said shaft means being slideably positionable to hold said hook means proximate to said hook protection means in a first position, said shaft means further being slideably positionable to move said hook means away from said hook protection means and to hang freely from said body means in a second position, said shaft means being releasably secured to trigger means for holding said shaft means in said first position, resilient means for resiliently biasing said shaft slideably from said first position to a said second position when said trigger is released, said trigger being released and said shaft being resiliently biased into said second position when said lure is moved through water, said trigger comprising sear means secured to pivotal diving plane means which is pivotally secured to stationary diving plane means, said stationary diving plane means being secured to said fishing lure, said pivotal diving plane means extending from said sear means for forcing said sear means to disengage said stop when said lure is drawn through water.

2. The fishing lure of claim 1 where said sear means is pivotally secured to said fishing lure through pivot means mounted on stationary diving plane means, said stationary diving plane means being secured to said body means.

* * * * *